(12) United States Patent
Patel et al.

(10) Patent No.: US 9,811,654 B2
(45) Date of Patent: Nov. 7, 2017

(54) SYSTEMS AND METHODS FOR PROVIDING AUTHENTICATION USING A MANAGED INPUT/OUTPUT PORT

(71) Applicant: Dell Products L.P., Round Rock, TX (US)

(72) Inventors: Rajeshkumar Ichchhubhai Patel, Bangalore (IN); Chandrasekhar Puthillathe, Bangalore (IN); Elie Antoun Jreij, Pflugerville, TX (US); Shawn Joel Dube, Austin, TX (US); Pablo Rafael Arias, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 54 days.

(21) Appl. No.: 14/301,701

(22) Filed: Jun. 11, 2014

(65) Prior Publication Data

US 2015/0363590 A1    Dec. 17, 2015

(51) Int. Cl.
*G06F 21/00*   (2013.01)
*G06F 21/44*   (2013.01)
*H04L 29/06*   (2006.01)

(52) U.S. Cl.
CPC ............ *G06F 21/44* (2013.01); *H04L 63/102* (2013.01); *H04L 63/0876* (2013.01)

(58) Field of Classification Search
None
See application file for complete search history.

(56) References Cited

U.S. PATENT DOCUMENTS

| | | | | |
|---|---|---|---|---|
| 7,305,562 B1 * | 12/2007 | Bianco | ............ | H04L 63/08 709/229 |
| 7,353,375 B2 * | 4/2008 | Cepulis | ............ | G06F 21/10 713/1 |
| 7,631,348 B2 * | 12/2009 | Villadiego | ............ | G06F 21/34 710/100 |

(Continued)

OTHER PUBLICATIONS

International Pat. App. No. PCT/US2015/020965, International Search Report and Written Opinion, mailed Jun. 26, 2015, 8 pages.

(Continued)

*Primary Examiner* — Maung Lwin
(74) *Attorney, Agent, or Firm* — Jackson Walker L.L.P.

(57) ABSTRACT

In accordance with embodiments of the present disclosure, an information handling system may include a processor, an input/output port communicatively coupled to the processor, and an access controller communicatively coupled to the processor. The an input/output port may be configured to receive an external input/output device and communicatively couple such input/output device to one or more information handling resources of the information handling system. The access controller may be configured to responsive to an attempted management operation at the information handling system, determine if an input/output device coupled to the input/output port is authenticated as a trusted input/output device. The access controller may also be configured to, responsive to determining that the input/output device is authenticated as a trusted input/output device, allow execution of the attempted management operation.

9 Claims, 3 Drawing Sheets

(56) References Cited

U.S. PATENT DOCUMENTS

| | | | |
|---|---|---|---|
| 7,788,700 B1* | 8/2010 | Feezel | G06F 21/31 713/163 |
| 7,823,214 B2* | 10/2010 | Rubinstein | G06F 21/445 713/170 |
| 7,917,670 B2* | 3/2011 | Nakao | G06F 21/78 326/8 |
| 8,880,752 B2* | 11/2014 | Hess | G06F 13/385 710/11 |
| 8,984,296 B1* | 3/2015 | Young | G06F 9/4411 713/176 |
| 2004/0059907 A1* | 3/2004 | Cochran | G06F 21/34 713/2 |
| 2006/0010317 A1* | 1/2006 | Lee | G06F 21/572 713/2 |
| 2006/0156415 A1 | 7/2006 | Rubinstein et al. | |
| 2006/0205354 A1* | 9/2006 | Pirzada | H04L 63/0492 455/66.1 |
| 2007/0242729 A1* | 10/2007 | Quinn | H04L 63/061 375/130 |
| 2009/0031013 A1* | 1/2009 | Kunchipudi | G06F 9/4416 709/222 |
| 2009/0125646 A1* | 5/2009 | Rosenan | G06F 21/82 710/15 |
| 2010/0011207 A1* | 1/2010 | Fox | H04L 63/0209 713/155 |
| 2010/0083360 A1 | 4/2010 | Zhang et al. | |
| 2010/0083366 A1* | 4/2010 | Challener | G06F 21/6218 726/17 |
| 2010/0083368 A1* | 4/2010 | Kristensen | G06F 21/34 726/18 |
| 2010/0100733 A1* | 4/2010 | Jaber | H04L 9/3215 713/168 |
| 2010/0172050 A1* | 7/2010 | Perusse, Jr. | G11B 17/228 360/71 |
| 2010/0199086 A1* | 8/2010 | Kuang | H04L 63/0869 713/155 |
| 2010/0202617 A1* | 8/2010 | Balakrishnan | G06F 21/575 380/277 |
| 2010/0281250 A1 | 11/2010 | Moineau et al. | |
| 2010/0292982 A1 | 11/2010 | Dube et al. | |
| 2012/0268886 A1* | 10/2012 | Leontiev | G06K 19/07749 361/679.31 |
| 2013/0024685 A1* | 1/2013 | Kolavennu | H04L 41/0806 713/153 |
| 2013/0159559 A1* | 6/2013 | Hess | G06F 13/385 710/14 |
| 2014/0007226 A1* | 1/2014 | Inoue | G06F 21/34 726/19 |
| 2014/0089671 A1* | 3/2014 | Logue | H04L 63/0884 713/182 |
| 2014/0173082 A1* | 6/2014 | Shin | H04L 41/24 709/223 |
| 2014/0208132 A1* | 7/2014 | Cheston | G06F 1/26 713/310 |
| 2014/0298023 A1* | 10/2014 | Oppermann | H04W 4/008 713/168 |

OTHER PUBLICATIONS

Rich, Donald, "Authentication in Transient Storage Device Attachments", IEEE Computer Society, USA, vol. 4, No. 4, Apr. 1, 2007, pp. 102-104.

Extended European Search Report, Application No. 15807135.7, dated Jun. 6, 2017.

* cited by examiner

SYSTEMS AND METHODS FOR PROVIDING AUTHENTICATION USING A MANAGED INPUT/OUTPUT PORT

TECHNICAL FIELD

The present disclosure relates in general to information handling systems, and more particularly to authentication of users of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In order to service an information handling system, a system administrator may in some instances need to be physically present at the information handling system to perform management operations on an information handling system. For example, some of such operations may include, without limitation, powering off an information handling system via a power button, booting to basic input/output system option read-only memories, booting to a boot manager, booting to pre-operating system environments (e.g., Windows PE), provisioning an information handling system from a local user interface (e.g., a liquid crystal display screen) for remote management purposes (e.g., setting an Internet Protocol address, subnet mask, Dynamic Host Configuration Protocol settings, etc.), booting from an operating system stored on an external storage medium (e.g., a Universal Serial Bus key), configuring an access controller/baseboard management controller (e.g., setting passwords), and automatically configuring information handling system settings with information stored on an external storage medium (e.g., a Universal Serial Bus key).

The need for such management operations may expose a security risk for an information handling system. For example, in traditional systems, an unauthorized user (e.g., one with malicious intent) may in some instances perform some of these management operations without any restrictions to tamper or misuse the information handling system. Controlling physical access of individuals to rooms or buildings in which an information handling system is located may partially mitigate such risks, but may be far from completely effective.

SUMMARY

In accordance with the teachings of the present disclosure, the disadvantages and problems associated with maintaining security of information handling systems may be reduced or eliminated.

In accordance with embodiments of the present disclosure, an information handling system may include a processor, an input/output port communicatively coupled to the processor, and an access controller communicatively coupled to the processor. The an input/output port may be configured to receive an external input/output device and communicatively couple such input/output device to one or more information handling resources of the information handling system. The access controller may be configured to responsive to an attempted management operation at the information handling system, determine if an input/output device coupled to the input/output port is authenticated as a trusted input/output device. The access controller may also be configured to, responsive to determining that the input/output device is authenticated as a trusted input/output device, allow execution of the attempted management operation.

In accordance with these and other embodiments of the present disclosure, a method may include, responsive to an attempted management operation at an information handling system, determining if an input/output device coupled to an input/output port of the information handling system is authenticated as a trusted input/output device, wherein the input/output port is configured to receive an external input/output device and communicatively couple such input/output device to one or more information handling resources of the information handling system. The method may also include, responsive to determining that the input/output device is authenticated as a trusted input/output device, allowing execution of the attempted management operation.

In accordance with these and other embodiments of the present disclosure, an article of manufacture may include a computer readable medium and computer-executable instructions carried on the computer readable medium. The instructions may be readable by a processor, the instructions, when read and executed, for causing the processor to responsive to an attempted management operation at an information handling system, determine if an input/output device coupled to an input/output port of the information handling system is authenticated as a trusted input/output device, wherein the input/output port is configured to receive an external input/output device and communicatively couple such input/output device to one or more information handling resources of the information handling system. The instructions may also cause the processor to, responsive to determining that the input/output device is authenticated as a trusted input/output device, allow execution of the attempted management operation.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
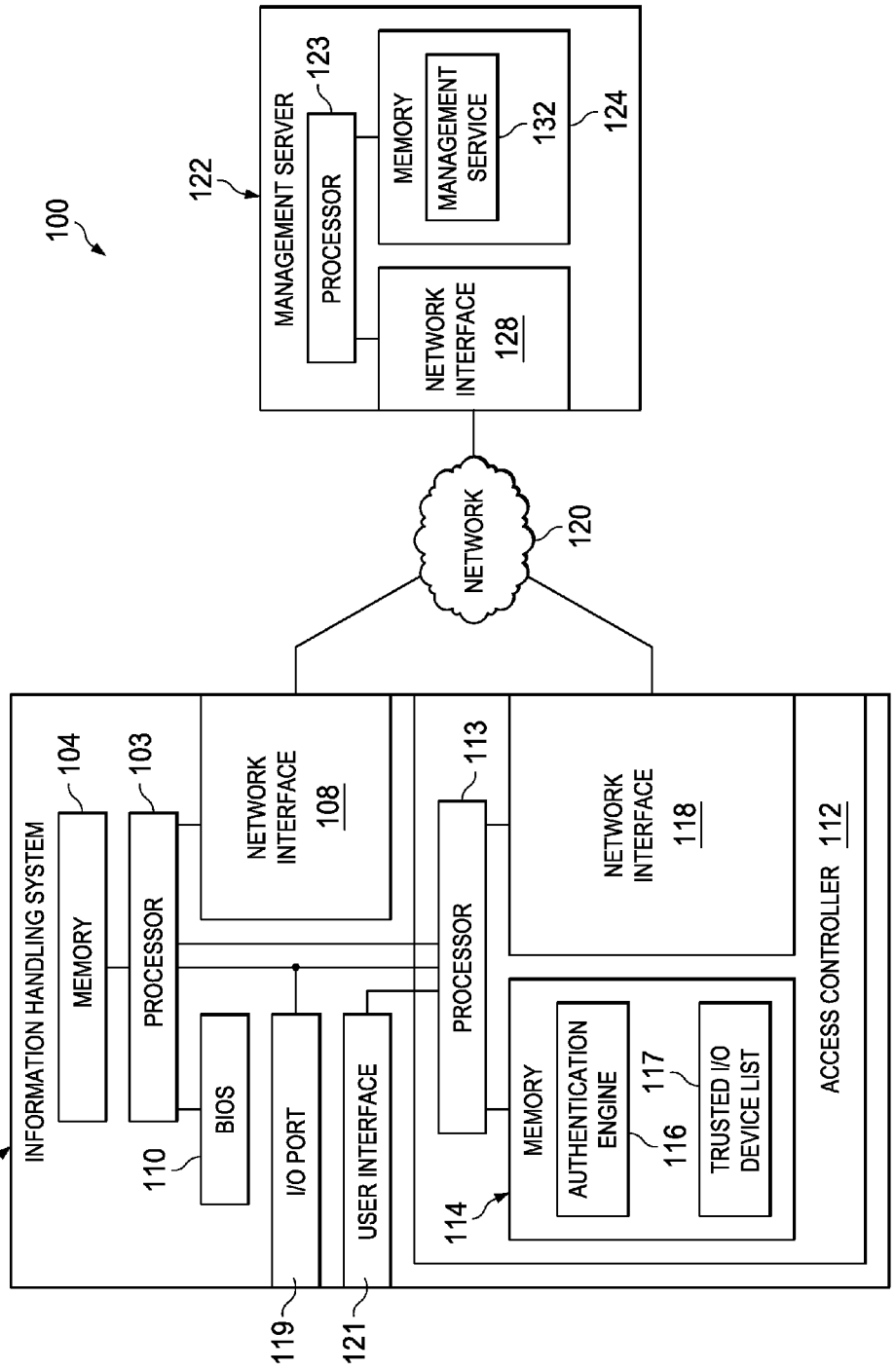
FIG. 1 illustrates a block diagram of an example system for providing authentication to an information handling system using a managed input/output port, in accordance with embodiments of the present disclosure.
Figure 2:
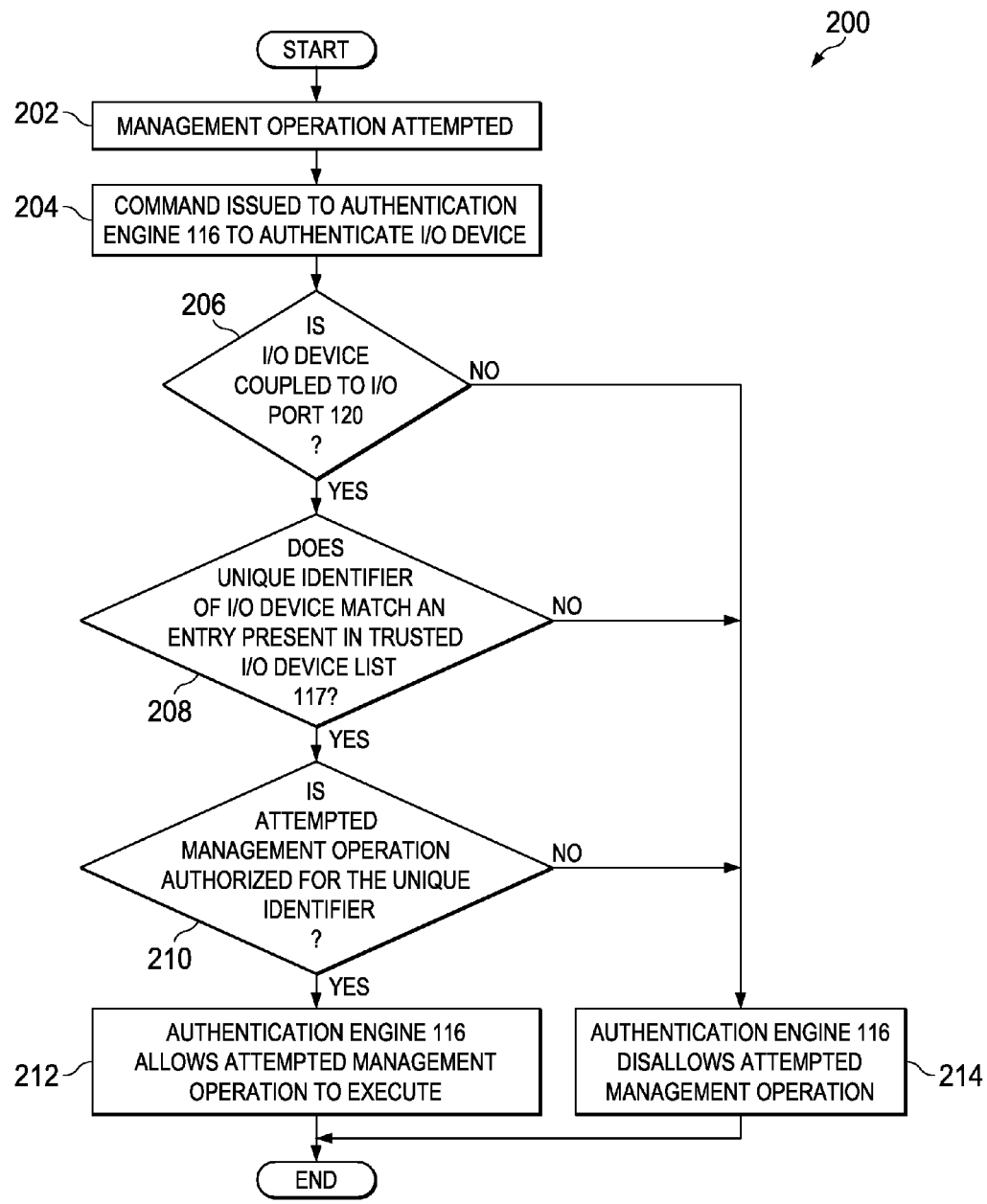
FIG. 2 illustrates a flow chart of an example method for providing authentication to an information handling system using a managed input/output port, in accordance with embodiments of the present disclosure.
Figure 3:
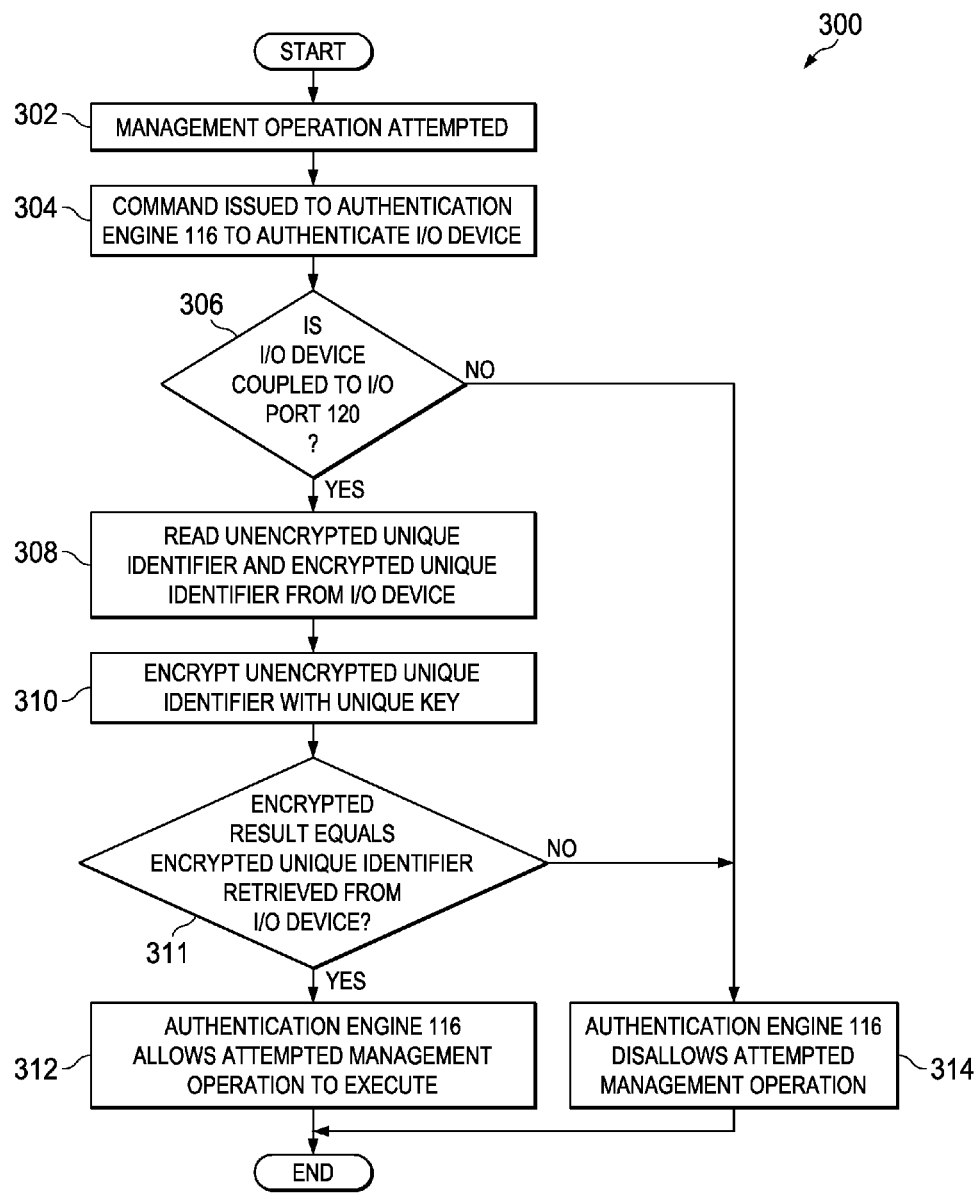
FIG. 3 illustrates a flow chart of another example method for providing authentication to an information handling system using a managed input/output port, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 for providing authentication to an information handling system 102 using a managed input/output port 119, in accordance with embodiments of the present disclosure. As shown in FIG. 1, system 100 may include information handling system 102 and a management server 122, and a network 120 communicatively coupling management server 122 to information handling system 102.

In some embodiments, information handling system 102 may be a personal computer. In some embodiments, information handling system may comprise or be an integral part of a server. In other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a network interface 108 communicatively coupled to processor 103, a basic input/output system (BIOS) 110 communicatively coupled to processor 103, an access controller 112 communicatively coupled to processor 103, an input/output (I/O) port 119 communicatively coupled to processor 103 and/or access controller 112, and a user interface communicatively coupled to user interface 121.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Network interface 108 may comprise any suitable system, apparatus, or device operable to serve as an interface between information handling system 102 and management server 122 and/or other information handling systems. Network interface 108 may enable information handling system 102 to communicate using any suitable transmission protocol and/or standard, including without limitation, all transmission protocols and/or standards enumerated below with respect to the discussion of network 120. In these and other embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

Access controller 112 may be configured to provide out-of-band management facilities for management of information handling system 102. Such management may be made by access controller 112 even if information handling system 102 is powered off or powered to a standby state. Access controller 112 may include a processor 113, memory 114, and an out-of-band network interface 118 separate from and physically isolated from in-band network interface 108. In certain embodiments, access controller 112 may include or may be an integral part of a BMC, DRAC, or an iDRAC.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or access controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to access controller 112 is turned off.

As shown in FIG. 1, memory 114 may include authentication engine 116. As described in greater detail elsewhere in this disclosure, authentication engine 116 may include any system, device, or apparatus configured to, as described in greater detail elsewhere in this disclosure, manage the authentication of I/O devices coupled to I/O port 119. In some embodiments, authentication engine 116 may be implemented as a program of instructions that may be read by and executed on processor 113 or processor 103 to carry out the functionality of authentication engine 116.

In addition, memory 114 may include a trusted I/O device list 117. Trusted I/O device list 117 may comprise a list, table, database, or other suitable data structure identifying (e.g., by a serial number or other unique identifier) I/O devices that when coupled to I/O port 119, are to be authenticated in order to permit a user present at information handling system 102 to perform one or more management operations.

Network interface 118 may comprise any suitable system, apparatus, or device operable to serve as an interface between access controller 112 and management server 122 and/or other information handling systems. Network interface 118 may enable access controller 112 to communicate using any suitable transmission protocol and/or standard, including without limitation, all transmission protocols and/or standards enumerated below with respect to the discussion of network 120. In these and other embodiments, network interface 118 may comprise a network interface card, or "NIC."

I/O port 119 may comprise any system, device, and apparatus configured to receive an external device and electrically couple such external device to processor 103 and/or access controller 112, and/or mechanically couple such external device to information handling system 102. For example, in some embodiments, an I/O port 119 may comprise a Universal Serial Bus (USB) port having a connector configured to receive a corresponding connector of a USB device (e.g., a USB key drive or thumb drive). In these and other embodiments, an I/O port 119 may comprise any other type of suitable external port (e.g., Serial Advanced Technology Attachment (SATA), serial port, parallel port, etc.) to which any suitable device may be coupled.

User interface 121 may include any system, apparatus, or device via which a user may interact with information handling system 102 and its various components by facilitating input from a user allowing the user to manipulate information handling system 102 and output to a user allowing information handling system 102 to indicate effects of the user's manipulation. For example, user interface 121 may include a display suitable for creating graphic images and/or alphanumeric characters recognizable to a user, and may include, for example, a liquid crystal display, a cathode ray tube, a plasma screen, and/or a digital light processor projection monitor. In certain embodiments, such a display may be an integral part of a chassis or other enclosure of information handling system 102 and receive power from power supplies (not explicitly shown) of such chassis, rather than being coupled to such chassis via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 121 may include other user interface elements (e.g., a keypad, buttons, and/or switches placed in proximity to a display) allowing a user to provide input to information handling system 102. User interface 121 may be coupled to access controller 112 and/or other components of information handling system 102, and thus may allow a user to configure various information handling resources of information handling system 102.

In addition to processor 103, memory 104, network interface 108, BIOS 110, access controller 112, I/O port 119, and user interface 121, information handling system 102 may include one or more other information handling resources.

Network 120 may be a network and/or fabric configured to couple management server 122 and information handling system 120 to each other and/or one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

In some embodiments, management server 122 may be a server. In other embodiments, management server 122 may be a personal computer (e.g., a desktop computer or a portable computer). As depicted in FIG. 1, management server 122 may include a processor 123, a memory 124 communicatively coupled to processor 123, and a network interface 128 communicatively coupled to processor 123.

Processor 123 may include any system, device, or apparatus configured to interpret and/or execute program instructions and/or process data, and may include, without limitation, a microprocessor, microcontroller, DSP, ASIC, or any other digital or analog circuitry configured to interpret and/or execute program instructions and/or process data. In some embodiments, processor 123 may interpret and/or execute program instructions and/or process data stored in memory 124 and/or another component of management server 122.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to management server 122 is turned off.

As shown in FIG. 1, memory 124 may have stored thereon management service 132. Management service 132 may include any system, device, or apparatus configured to permit an administrator of information handling system 102 to manage information handling system 102 remotely via network 120. In some embodiments, management service 132 may be implemented as a program of instructions that may be read by and executed on processor 123 to carry out the functionality of management service 132.

Network interface 128 may comprise any suitable system, apparatus, or device operable to serve as an interface between management server 122 and network 120. Network interface 128 may enable management server 122 to communicate using any suitable transmission protocol and/or standard, including any of the protocols and/or standards described above with respect to network 120. In these and other embodiments, network interface 128 may comprise a NIC.

In addition to processor 123, memory 124, and network interface 128, management server 122 may include one or more other information handling resources.

In operation, an administrator may interface (e.g., via user interface 121 or via management service 132 executing on management server 122) with authentication engine 116 of access controller 112 to configure trusted I/O device list 117 with a list of unique identifiers (e.g., serial numbers) of trusted I/O devices (e.g., USB keys) that may be used to authenticate devices coupled to I/O port 119 to allow a user to undertake one or more management operations when a trusted device is coupled to I/O port 119. In some embodiments, trusted I/O device list 117 may also, in addition to listing trusted I/O devices, set forth authorized management operations associated with each trusted I/O device, such that certain I/O devices may have different privileges for executing management operations. In these and other embodiments, an administrator may also be able to add a unique identifier to trusted I/O device list 117 by coupling a trusted I/O device to I/O port 119, and executing an instruction to populate trusted I/O device list 117 with the unique identifier of the I/O device coupled to I/O port 119.

Once trusted I/O device list 117 is configured, unique identifiers of trusted I/O devices may then be used as authentication parameters to permit execution of one or more management operations when a trusted I/O device is coupled to I/O port 119. An example method of performing such authentication is set forth in FIG. 2 below.

FIG. 2 illustrates a flow chart of an example method 200 for providing authentication to information handling system 102 using a managed I/O port (e.g., I/O port 119), in accordance with embodiments of the present disclosure. According to some embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, an individual may attempt to execute a management operation on information handling system 102. At step 204, in response to the attempt to execute a management operation, a command may be issued to authentication engine 116 to authenticate an I/O device. When the management operation involves an attempted management operation associated with BIOS 110, BIOS 110 may issue such a command to access controller 112 via an Intelligent Platform Management Interface command or other suitable command.

At step 206, in response to receiving the command to authenticate an I/O device, authentication engine 116 may determine if an I/O device is coupled to I/O port 119. If an I/O device is coupled to I/O port 119, method 200 may proceed to step 208. Otherwise, method 200 may proceed to step 214.

At step 208, in response to determining that an I/O device is coupled to I/O port 119, authentication engine 116 may determine if a unique identifier (e.g., serial number) of the I/O device matches an entry present in trusted I/O device list 117. If the unique identifier of the I/O device matches an entry present in trusted I/O device list 117, method 200 may proceed to step 210. Otherwise, method 200 may proceed to step 214.

At step 210, in response to determining that the unique identifier of the I/O device matches an entry present in trusted I/O device list 117, authentication engine 116 may determine (e.g., by reference to trusted I/O device list 117) whether the attempted management operation is authorized for the unique identifier. If the attempted management operation is authorized for the unique identifier, method 200 may proceed to step 212. Otherwise, method 200 may proceed to step 214.

At step 212, in response to determining that the attempted management operation is authorized for the unique identifier, authentication engine 116 may allow the attempted management operation to execute. After completion of step 212, method 200 may end.

At step 214, in response to determining that an I/O device is not coupled to I/O port 119, determining that the unique identifier of the I/O device does not match an entry present in trusted I/O device list 117, or determining that the attempted management operation is not authorized for the unique identifier, authentication engine 116 may disallow the attempted management operation. In some embodiments, authentication engine 116 may also log the attempted management operation for audit purposes. After completion of step 214, method 200 may end.

Although FIG. 2 discloses a particular number of steps to be taken with respect to method 200, method 200 may be executed with greater or fewer steps than those depicted in FIG. 2. For example, in some embodiments, any authenticated I/O device may be used to authorize all management operations, and in such embodiments, step 210 may not be present. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

FIG. 3 illustrates a flow chart of another example method 300 for providing authentication to information handling system 102 using a managed I/O port (e.g., I/O port 119), in accordance with embodiments of the present disclosure. According to some embodiments, method 300 may begin at step 302. As noted above, teachings of the present disclosure may be implemented in a variety of configurations of system 100. As such, the preferred initialization point for method 300 and the order of the steps comprising method 300 may depend on the implementation chosen.

At step 302, an individual may attempt to execute a management operation on information handling system 102. At step 304, in response to the attempt to execute a management operation, a command may be issued to authentication engine 116 to authenticate an I/O device. When the management operation involves an attempted management operation associated with BIOS 110, BIOS 110 may issue such a command to access controller 112 via an Intelligent Platform Management Interface command or other suitable command.

At step 306, in response to receiving the command to authenticate an I/O device, authentication engine 116 may determine if an I/O device is coupled to I/O port 119. If an I/O device is coupled to I/O port 119, method 300 may proceed to step 308. Otherwise, method 300 may proceed to step 314.

At step 308, in response to determining that an I/O device is coupled to I/O port 119, authentication engine 116 may read an unencrypted unique identifier and an encrypted unique identifier from the I/O device. The encrypted unique identifier may be created by authentication engine 116 when the I/O device is made a trusted device of information handling system 102. For example, to make an I/O device trusted, authentication engine 116 may, responsive to a command from an authorized administrator of information handling system 102, read a unique identifier from an I/O device coupled to I/O port 119, encrypt it with a unique key (e.g., unique to information handling system 102 and stored on access controller 112), and write the encrypted unique identifier back to the I/O device. At a later time, when authenticating the I/O device, authentication engine 116 may determine from the unencrypted unique identifier and the encrypted unique identifier whether an I/O device is authenticated, as discussed in greater detail below.

At step 310, authentication engine 116 may encrypt the unencrypted unique identifier with the unique key. At step 311, authentication engine 116 may compare such encrypted result with the encrypted unique identifier retrieved from the I/O device. If the two values match, the I/O device is authenticated, and method 300 may proceed to step 312. Otherwise, the I/O device is not trusted, and method 300 may proceed to step 314.

At step 312, in response to determining that the attempted management operation is authorized for the unique identifier, authentication engine 116 may allow the attempted management operation to execute. After completion of step 312, method 300 may end.

At step 314, in response to determining that an I/O device is not coupled to I/O port 119 or determining that the unique identifier of the I/O device is not authenticated, authentication engine 116 may disallow the attempted management operation. In some embodiments, authentication engine 116 may also log the attempted management operation for audit purposes. After completion of step 314, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using system 100 or any other system operable to implement method 300. In certain embodiments, method 300 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
a processor;
an input/output port communicatively coupled to the processor and configured to receive an external input/output device and communicatively couple the external input/output device to one or more information handling resources of the information handling system; and
an access controller communicatively coupled to the processor and configured to:
provide out-of-band management of the information handling system via a communications channel separate from and physically isolated from a network interface for in-band communication between the processor and an external network;
responsive to detecting an attempt to perform any management operation selected from a group of management operations requiring an administrator physically present at the information handling system:
determine if the external input/output device is coupled to the input/output port; and
determine if the external input/output device is authenticated as a trusted input/output device;

responsive to determining that the external input/output device is authenticated as a trusted input/output device, allow execution of the attempted management operation; and responsive to determining that the external input/output device is not coupled to the input/output port, disallow execution of the attempted management operation;

wherein the group of management operations requiring the administrator physically present at the information handling system includes:
  powering off the information handling system via a power button;
  booting to basic input/output system option read-only memories;
  booting to a boot manager;
  booting to pre-operating system environment;
  provisioning the information handling system from a local user interface via a liquid crystal display screen for remote management purposes;
  booting from an operating system stored on an external storage medium;
  configuring a baseboard management controller; and
  automatically configuring information handling system settings with information stored on an external storage medium.

2. The information handling system of claim 1, wherein the access controller is further configured to, responsive to determining that the external input/output device is not authenticated as a trusted input/output device, disallow execution of the attempted management operation.

3. The information handling system of claim 1, wherein determining if the external input/output device coupled to the input/output port is authenticated as a trusted input/output device comprises:
  comparing a unique identifier of the external input/output device to a list of trusted input/output devices stored on a computer-readable medium accessible to the access controller; and
  determining the external input/output device to be authenticated if the unique identifier is present in the list of trusted input/output devices.

4. The information handling system of claim 1, the access controller further configured to:
  determine if the attempted management operation is an authorized attempted management operation associated with the external input/output device; and
  responsive to determining that the external input/output device is authenticated as a trusted input/output device and that the attempted management operation is an authorized attempted management operation associated with the external input/output device, allow execution of the attempted management operation.

5. The information handling system of claim 4, wherein determining if the attempted management operation is an authorized attempted management operation associated with the external input/output device comprises:
  referencing a list of unique identifiers of trusted input/output devices stored on a computer-readable medium accessible to the access controller, wherein for each unique identifier, the list sets forth authorized management operations associated with such unique identifier; and
  determining the attempted management operation to be authorized if the list indicates that the attempted management operation is associated with the unique identifier of the external input/output device.

6. The information handling system of claim 1, wherein the input/output port is configured to receive input/output devices compliant with the Universal Serial Bus standard.

7. The information handling system of claim 1, wherein determining if the external input/output device coupled to the input/output port is authenticated as a trusted input/output device comprises:
  reading an unencrypted unique identifier and an encrypted unique identifier from the external input/output device;
  encrypting the unencrypted unique identifier;
  comparing a result of encrypting the unencrypted unique identifier to the encrypted unique identifier read from the external input/output device; and
  determining the external input/output device to be authenticated if the result of encrypting the unencrypted unique identifier matches the encrypted unique identifier read from the external input/output device.

8. The information handling system of claim 7, wherein encrypting the unencrypted unique identifier comprises encrypting the unencrypted unique identifier with a key unique to the information handling system.

9. The information handling system of claim 8, wherein the encrypted unique identifier read from the external input/output device is generated by encrypting the unencrypted unique identifier with the key.

* * * * *